United States Patent [19]

Naberhuis

[11] Patent Number: 5,270,892
[45] Date of Patent: Dec. 14, 1993

[54] CONDUCTOR CONFIGURATION FOR MAGNETORESISTIVE TRANSDUCERS

[75] Inventor: Steven L. Naberhuis, Fremont, Calif.

[73] Assignee: Hewlett-Packard Company, Palo Alto, Calif.

[21] Appl. No.: 894,393

[22] Filed: Jun. 5, 1992

[51] Int. Cl.⁵ .............................. G11B 5/30
[52] U.S. Cl. ............................... 360/113
[58] Field of Search ................. 360/113, 126

[56] References Cited

U.S. PATENT DOCUMENTS

| | | | |
|---|---|---|---|
| 3,860,965 | 1/1975 | Voegeli | 360/113 |
| 3,879,760 | 4/1975 | Lazzari | 360/113 |
| 5,084,794 | 1/1992 | Smith | 360/113 |

OTHER PUBLICATIONS

G. V. Kelley et al., "High-Track-Density, Coupled-Film Magnetoresistive Head", Nov. 6, 1981, pp. 2890–2892.

*Primary Examiner*—John H. Wolff

[57] ABSTRACT

In a dual stripe magnetoresistive transducer a unique conductor configuration is provided that allows close spacing of the two magnetoresistive stripes while providing a nearly identical topography for each of the stripes. A first conductor is arranged on a transducer substrate with an associated magnetoresistive stripe oriented directly above the conductor. A second magnetoresistive stripe is arranged above the first stripe. The second MR stripe, in turn, has an associated conductor oriented above it such that the two stripes may be brought close together, separated only by a thin dielectric layer.

8 Claims, 1 Drawing Sheet

CONDUCTOR CONFIGURATION FOR MAGNETORESISTIVE TRANSDUCERS

BACKGROUND OF THE INVENTION

1. Technical Field

The present invention relates to magnetoresistive transducers. More particularly, the present invention relates to a conductor configuration for dual stripe magnetoresistive transducers.

2. Description of the Prior Art

Continuing advances in magnetic media technology allow increasing data storage densities. One active area of development is that of reading and writing transducers. As such transducers are made smaller and smaller, data densities are increased. Magnetoresistive (MR) thin film technology has provided a particularly promising area of inquiry with regard to producing smaller reading and writing transducers. In such technology, MR conductive thin films, are formed into parallel stripes on a substrate using techniques analogous to those of the semiconductor arts. It is desirable to arrange the MR stripes as close together as possible to provide a narrow active region at a transducer air bearing surface. Dual stripe MR transducers, such as are described in U.S. Pat. No. 3,860,965, issued to Voegeli, and U.S. Pat. No. 3,879,760, issued to Lazzari, reflect the current state of the art.

Dual stripe magnetoresistive (MR) transducers require two sets of conductors to provide a supply of current for correctly biasing both MR stripes. The magnetic properties of ferromagnetic thin films used to produce MR transducers are strongly influenced by the topographical features of structures formed on a transducer substrate. Thus, the topography and arrangement of these conductors can affect the topography and spacing of the MR stripes. Topological effects result in different magnetic properties for each stripe. Thus, the noise characteristic for each stripe, referred to as Barkhausen noise, is different.

To provide an effective dual stripe MR transducer, ideally identical domain states should be present in each of the MR stripes. A transducer signal is typically a differential output of the two MR stripes. In this way Barkhausen noise in the two stripes should be largely cancelled through common mode rejection.

Approaches in prior art to providing a dual stripe MR transducer, for example as described by Kelley et al, *IEEE Trans. Mag.*, MAG-17,6, November 1981 teach a transducer structure in which one MR stripe is flat. A second MR stripe which is provided is not flat. This difference is due to the shape of the conductors which are attached to the first stripe. This inconsistency in topography produces stripes having different magnetic properties. The resulting problem of Barkhausen noise is pronounced.

U.S. Pat. No. 3,879,760, is issued to Lazzari shows a conductor pattern which does not define the track edges. Rather, the MR stripes define the track edges. This configuration requires short MR stripes for small track widths and, therefore, is subject to multiple domains, which give rise to Barkhausen noise.

It has also been shown in the art (e.g. Lazzari) that if the two MR stripes in an MR transducer are arranged such that they are spaced apart by a large amount, then the two MR stripes exhibit similar topographies. This condition exists if the conductors for the first MR stripe are planarized. However, close coupling between the two stripes are then sacrificed and ideally identical domain state are unlikely.

SUMMARY OF THE INVENTION

The present invention provides a dual stripe MR transducer structure in which current carrying conductors for the MR stripes are arranged such that close coupling between the MR stripes is possible while maintaining very similar topographies for the stripes. In this way, Barkhausen noise is reduced or eliminated while data density and transducer sensitivity are improved. Furthermore, the present invention provides the definition of the sensitive area by the conductor edges and not by the MR stripes themselves, as is taught in the prior art.

In the preferred embodiment of the invention, a transducer substrate includes a first conductor arranged underneath a first MR stripe and a second conductor arranged above a second MR stripe. In this way, the stripes may be brought very close together, separated only by a thin dielectric. Additionally, the two stripes follow the same topography and thus exhibit similar magnetic characteristics. In particular, the topography is preferably planar as provided by planarizing dielectrics or planarized dielectrics/conductors.

DETAILED DESCRIPTION OF THE INVENTION

Figure 1:
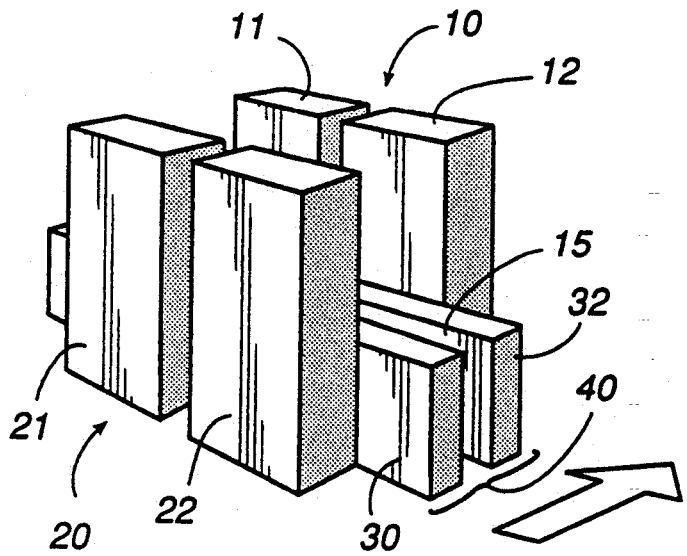
FIG. 1 is a side view of a portion of a magnetoresistive transducer showing the MR stripes and their associated conductors according to the present invention.

The present invention is best understood by referring to the Drawings in connection with review of this Description. The present invention provides unique conductor arrangement finding application in dual stripe magnetoresistive (MR) heads.

FIG. 1 is an elevational view of a portion of an MR transducer. Orientation of the transducer is seen with reference to an air bearing surface 40 which provides an active region that is maintained in proximity with a magnetic medium. The direction in which the magnetic medium is moved through the active region of the transducer is indicated by the arrow in the Fig.

As shown in the Fig., a first conductor 10, including conductor elements 11,12 is fabricated on a substrate (not shown). A first MR stripe 32 is formed over the conductor 10 and is spaced from a second MR stripe 30 by an insulating dielectric 15. A second conductor 20, including conductor elements 21,22 is formed above the second conductor 20. In the preferred embodiment of the invention, the MR stripes may be from 10 to 60 nm thick.

Figure 2:
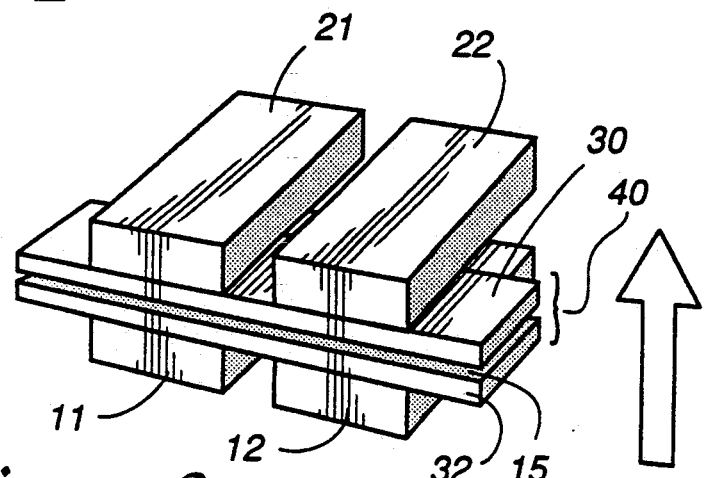
FIG. 2 is an air bearing surface view of a portion of an MR transducer showing the MR stripes and their associated conductors according to the present invention.

FIG. 2 provides another elevational view of a portion of an MR transducer according to the present invention. The Fig. shows an air bearing surface 40 across which a magnetic medium is passed in a direction indicated by the arrow. The structure of a dual stripe MR transducer made in accordance with the teachings of the present invention is shown in the Fig. in which a conductor 11,12 is first formed and upon which a first MR stripe 32 is formed. The conductor/stripe is separated from a second MR stripe 30 and its associated conductor 21,22 by the insulating dielectric 15.

Figure 3:
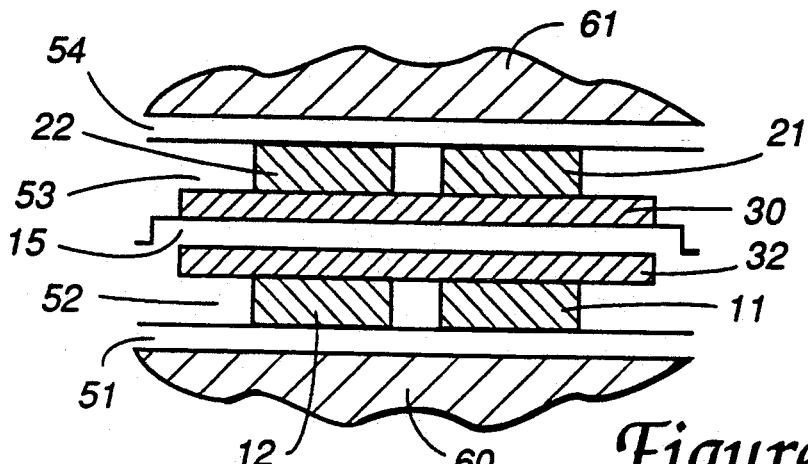
FIG. 3 is an air bearing surface plane view of a portion of an MR transducer in which dielectrics and shields are depicted, as well as the MR stripes and their associated conductors according to the present invention.

FIG. 3 shows an air bearing surface plane view of the present invention in which MR stripe/conductor pairs 11,12,32 and 21,22,30 are spaced apart by the dielectric 15, which controls the distance therebetween and which may be on the order of 30 to 150 nm thick. In the structure shown, two shields 60,61 are included to limit susceptibility of the transducer to ambient noise and to provide for better resolution in the track direction. The shields are insulated from the transducer conductors/stripes by the inclusion of insulating dielectrics 51,54. Additionally, planarizing dielectrics 52,53 are provided. The dielectrics may be formed from either organic or inorganic materials.

Thus, the present invention provides a dual stripe MR transducer structure in which a bottom conductor is arranged to provide a source of current to a first MR stripe. A second MR stripe is spaced from the first MR stripe by an insulating dielectric and is contacted by a second conductor disposed above it.

In this structure the first conductor is preferably planarized to provide a flat surface upon which the first and second MR stripes may be formed. Thus, an even and consistent topography is provided for both MR stripes and Barkhausen noise is therefore reduced or eliminated. The stripes themselves may be formed with a minimal amount of dielectric providing a narrow spacing.

The present invention addresses the limitations that exist in the art and allows the production of closely spaced uniform MR stripes in a dual stripe MR head.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

I claim:

1. A dual stripe magnetoresistive transducer, comprising:
    a substrate having a substantially planar surface;
    a first set of conductor elements formed above the substrate and having a substantially planar surface;
    a first magnetoresistive stripe formed above the first conductor and having a substantially planar surface;
    a second magnetoresistive stripe and having a substantially planar surface above the first magnetoresistive stripe;
    a dielectric formed between said first and second magnetoresistive stripes; and
    a second set of conductor elements formed above the second magnetoresistive stripe and having a substantially planar surface whereby said transducer provides a single active area defined by the surfaces of the conductors,
    with said substantially planar transducer surfaces defining an air bearing surface which represents the active region arrayed proximate a magnetic medium, whereby the magnetic field associated with current in said sets of conductors is substantially canceled.

2. The transducer of claim 1, wherein said dielectric is from 30 to 150 nm thick.

3. The transducer of claim 1, wherein said magnetoresistive stripes are from 10 to 60 nm thick.

4. The transducer of claim 1, wherein said first set of conductor elements is planarized to provide a flat surface.

5. A method of fabricating a dual stripe magnetoresistive transducer, comprising the steps of:
    forming a first set of conductor elements above a transducer substrate and having a substantially planar surface;
    forming a dielectric above said first magnetoresistive stripe;
    forming a second magnetoresistive stripe above the dielectric and having a substantially planar surface; and
    forming a second set of conductor element above the second magnetoresistive stripe with a substantially planar surface, whereby said transducer provides a single active area defined by the surfaces of the conductors,
    with said substantially planar transducer surfaces defining an air bearing surface which represents the active region arrayed proximate a magnetic medium, whereby the magnetic field associated with current in said sets of conductors is substantially canceled.

6. The method of claim 5, wherein said dielectric is from 30 to 150 nm thick.

7. The method of claim 5, wherein said magnetoresistive stripes are from 10 to 60 nm thick.

8. The method of claim 5, wherein said first conductor is planarized to provide a flat surface.

* * * * *

UNITED STATES PATENT AND TRADEMARK OFFICE
CERTIFICATE OF CORRECTION

PATENT NO. : 5,270,892
DATED : December 14, 1993
INVENTOR(S) : Steven L. Naberhuis It is certified that error appears in the above-indentified patent and that said Letters Patent is hereby corrected as shown below:

Column 4, line 32, after "planar surface" insert -- forming a first magnetoresistive stripe above the first conductor and having a substantially planar surface --.

Signed and Sealed this

Eighteenth Day of October, 1994

Attest:

BRUCE LEHMAN

Attesting Officer

Commissioner of Patents and Trademarks